(No Model.) 3 Sheets—Sheet 1.
L. BRILLIÉ.
APPARATUS FOR REGISTERING THE CONSUMPTION OF ELECTRIC ENERGY.
No. 403,244. Patented May 14, 1889.
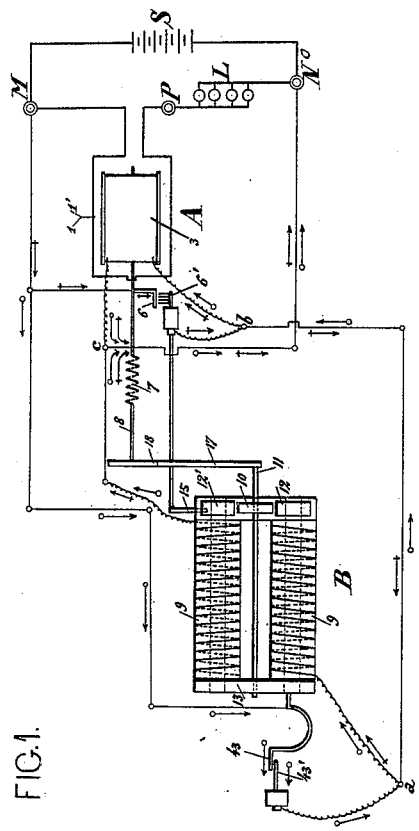
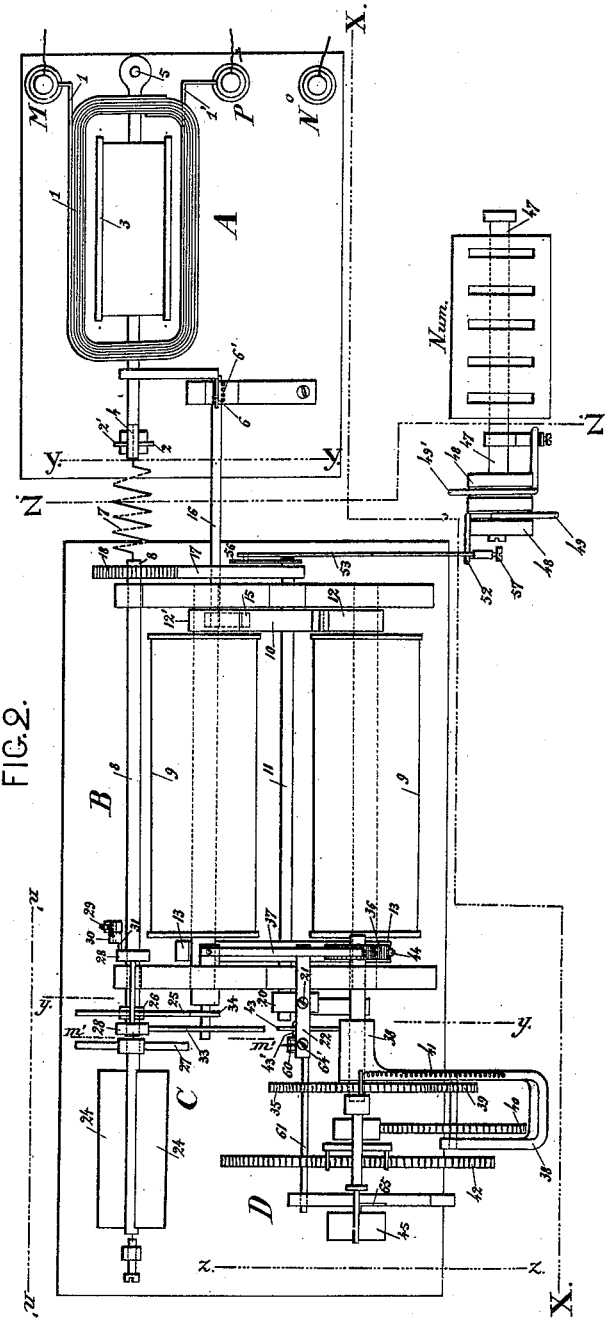

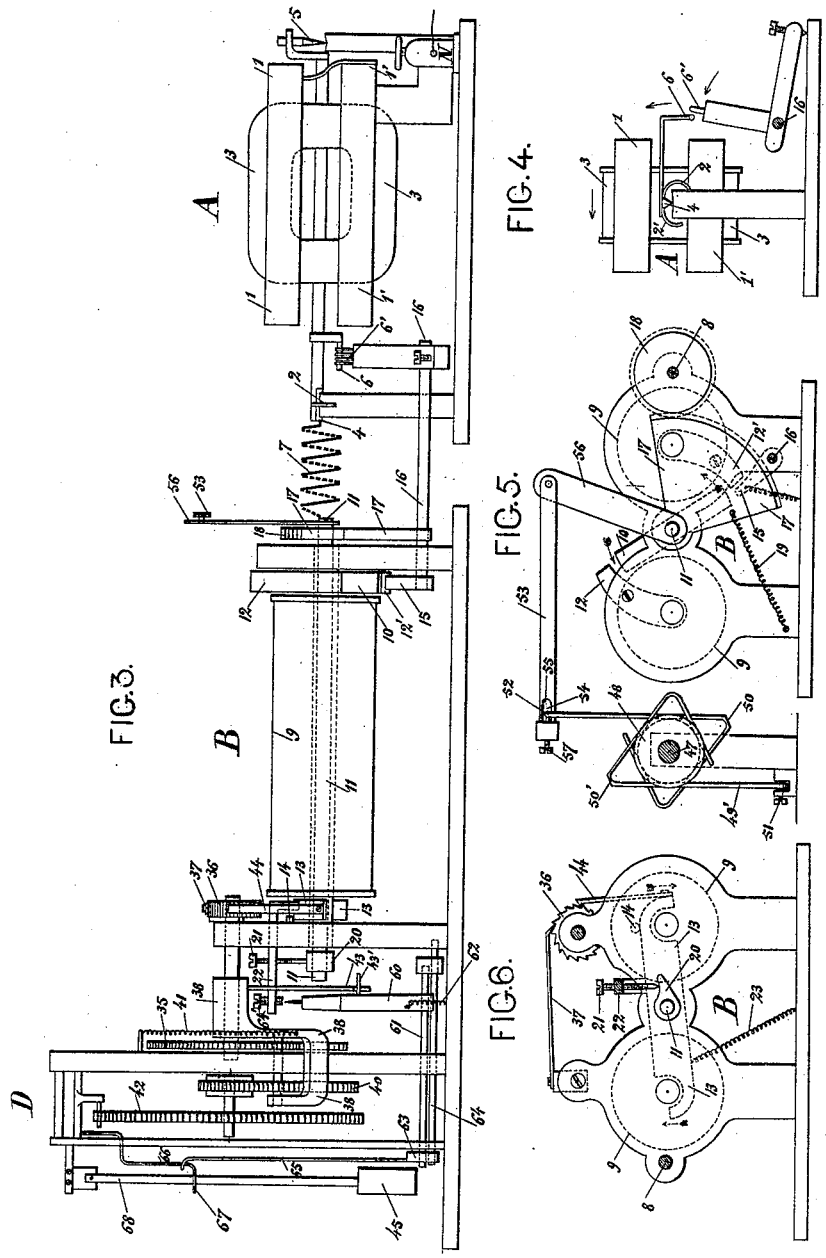

(No Model.) 3 Sheets—Sheet 3.
L. BRILLIÉ.
APPARATUS FOR REGISTERING THE CONSUMPTION OF ELECTRIC ENERGY.
No. 403,244. Patented May 14, 1889.
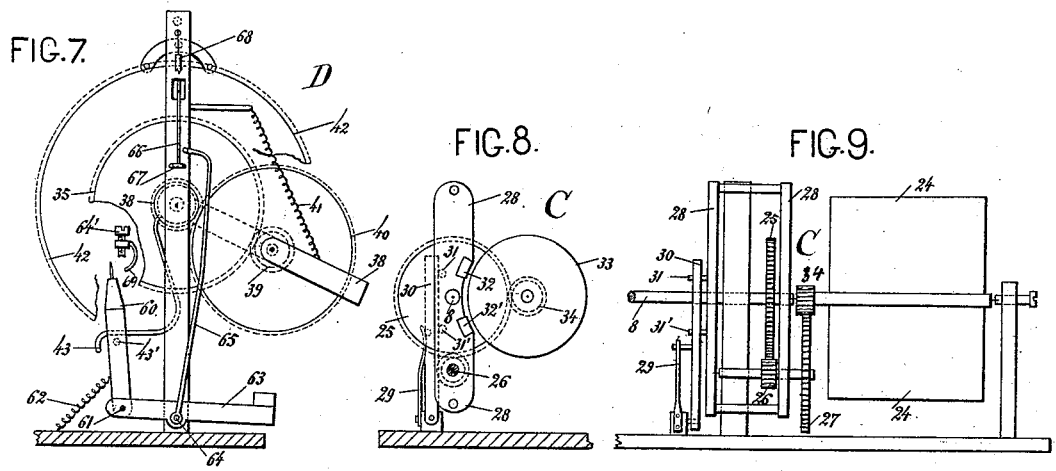
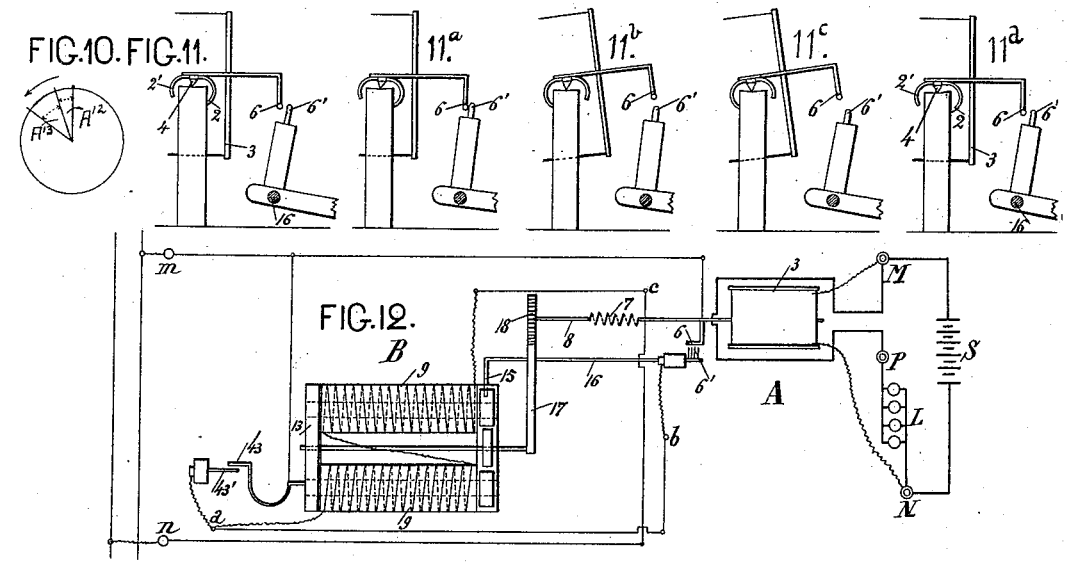
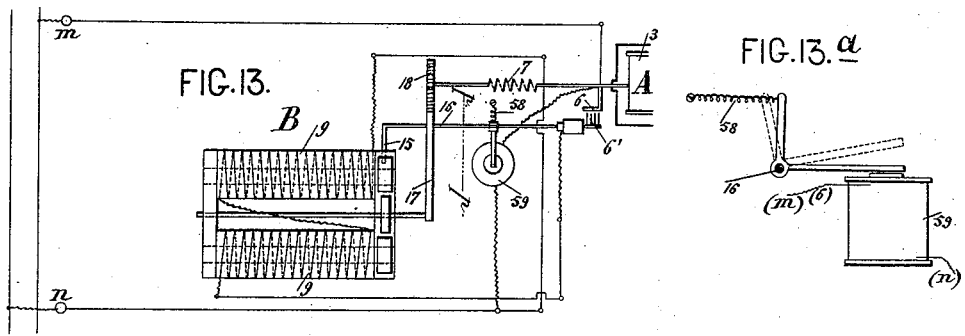

UNITED STATES PATENT OFFICE.

LUCIEN BRILLIÉ, OF PARIS, FRANCE.

APPARATUS FOR REGISTERING THE CONSUMPTION OF ELECTRIC ENERGY.

SPECIFICATION forming part of Letters Patent No. 403,244, dated May 14, 1889.

Application filed December 29, 1888. Serial No. 294,962. (No model.) Patented in France April 14, 1888, No. 189,949.

*To all whom it may concern:*

Be it known that I, LUCIEN BRILLIÉ, of Paris, in the Republic of France, have invented certain new and useful Improvements in Apparatus for Registering the Consumption of Electric Energy, (for which Letters Patent heretofore were granted to me by the government of France, dated April 14, 1888, No. 189,949;) and I do hereby declare that the following is a full, clear, and exact description of the invention, which will enable others skilled in the art to which it appertains to make and use the same.

This new apparatus relates to the class of Watts hour-meters; and it is based on the employment of a torsion electro-dynamometer, and serves to measure periodically the angle of torsion of the spring of the electro-dynamometer.

The apparatus I am about to describe is designed for measuring continuous currents; but an arrangement which will be further described near the end of the specification allows of also measuring alternating currents.

The apparatus represented in the drawings registers the sum of the products E × 1 effected at equal intervals of time—one hundred times per hour, for example—1 being the intensity of the current which passes through the conductors in which the electric force is expended, E the difference of potential at the ends of the conductors.

In order to enable the invention to be fully understood, I will describe the same by reference to the accompanying drawings, in which—

Figure 1 shows the arrangement of the apparatus as a whole and the direction of the current of derivation which works it. Fig. 2 is a plan of the apparatus, the wires which are represented in Fig. 1 being omitted. Fig. 3 is a sectional elevation taken on the line $x\,x$ of Fig. 2. Fig. 4 is a sectional elevation on the line Y Y of Fig. 2. Fig. 5 is a sectional elevation on the line Z Z of Fig. 2. Fig. 6 is a sectional elevation on the line $y\,y$ of Fig. 2, the parts for moderating the speed being omitted. Fig. 7 is an end view of the clock-movement, taken on the line $z\,z$ of Fig. 2. Fig. 8 is a vertical section taken on the line $m'\,m'$ of Fig. 2. Fig. 9 is an elevation of the speed-regulator, taken on the line $n'\,n'$ of Fig. 2. Fig. 10 is a diagram showing the angles of the turning movement of the shaft 11. Figs. 11, $11^a$, $11^b$, $11^c$, and $11^d$ are diagrams showing the positions consecutively taken by the contact-pieces 6 6'. Figs. 12, 13, and $13^a$ show modifications.

The apparatus is constructed of five principal parts, as shown in Figs. 1 and 2: first, a torsion electro-dynamometer, A, which values the product E × 1; second, an electromotor, B, which at each measuring operation winds up the clock-work D, slowly distends the spring of the electro-dynamometer until its movable bobbin becomes displaced under its action, and finally returns it to its original position; third, a governor or regulator, C, which regulates the various movements; fourth, a clock-movement, D, determining the interval of thirty-six seconds between each measuring operation; fifth, a register, N, Figs. 1 and 2, of the sum of the products E × 1, by advancing at each measuring operation a proportionate degree to the angle of torsion of the spring of the electro-dynamometer. I will describe in detail each one of these parts in order that the working of the apparatus may be fully understood.

*Electro-dynamometer.*—The electro-dynamometer A, Figs. 2, 3, and 4, is constructed (similarly to other known apparatus of this class) of two fixed coils, 1 1', of thick conductors or of strips of copper traversed one after another by the current, (the intensity of which is 1,) and of a movable bobbin, 3, wound with fine wire, traversed at the moment of each measuring operation by a proportional current of E. The axis of the bobbin 3 rests on a knife-edge, 4, and a point, 5, which allows of the bobbin 3 being balanced on the horizontal axis. The displacement is sufficient to break contact at 6 6'. It is limited by two stops, 2 2', placed at each side, so as to insure the same position at each measuring operation. To the end of the bobbin-axis is fixed one end of a torsion-spring, 7, the other end of which is fixed to a horizontal shaft, 8, which is driven by the electromotor B.

*Electromotor.*—The electromotor B, Figs. 2, 3, 5, and 6, is constructed of an electromagnet, 9 9, acting simultaneously on three armatures—namely, first, the principal armature 10, Figs. 2 and 5, fixed on the shaft 11 and placed between the curved pole-pieces 12 and 12', which cause it to turn through a sufficiently large angle; second, the oscillating bar 13, Figs. 2, 3, and 6, movable on the shaft 11, and the movement of which, limited by the pin 14, fixed in the frame of the motor, is utilized for periodically winding up the clock-movement and putting it in operation; third, an iron tappet, 15, Figs. 2, 3, and 5, placed under the pole-piece 12' and fixed on the shaft 16, moves the part 6' of the contact 6 6' of the electro-dynamometer A. (See Figs. 2 and 4.) The shaft 11 of the principal armature 10 transmits its movement, (which it receives from this latter,) by means of a toothed sector, 17, and a pinion, 18, to the shaft 8, which actuates the governor C, which regulates the torsional movement of the spring 7 above mentioned. The shaft 11 is brought back to its position of rest by the spring 19, Fig. 5. The stop 20, Fig. 6, which is keyed on the shaft, then comes under the screw 21, which is placed on the arm 22, fixed to the oscillating bar 13, which can only be lowered slowly by causing the shaft 11 to turn, while it can rise again quickly under the action of the spring 23, Fig. 6.

*Governor.*—The governor C, Figs. 2, 8, and 9, is intended to render as constant as possible the torsional movement of the spring 7. The axis of the flier 24 is a continuation of the axis 8, Figs. 2 and 9, on which is fixed the toothed wheel 25, which turns the flier 24 by means of a pinion, 26, and toothed wheel 27, which are mounted in a frame, 28, movable on the shaft 8. This frame is kept in its normal position by means of a spring, 29, acting by means of the lever 30 on pins 31 and 31', fixed to the frame. The torsion of the said spring 29 corresponds with the force which must act on the winch 24 to give it its normal speed. The frame 28 is inclined during rotation, and the brake-blocks 32 and 32' can act as a brake on the disk 33, which is driven by means of the pinion 34 from the wheel 25, and the excess of force in the shaft 8 is thus absorbed by friction. This governor regulates effectively the torsional movement of the spring 7.

*Clock-work.*—The clock-work D, Figs. 2, 3, and 7, is operated by means of satellited wheels. Normally the wheel 35 is held fixed by the ratchet-wheel 36, Figs. 2, 3, and 6, and the fixed pawl 37. The frame 38, which supports the satellite-wheels 39 and 40, Figs. 3 and 7, under the action of the spring 41, rises in proportion as the escape-wheel 42 turns under its action. By the expression "satellite-wheels" I mean toothed wheels which, like the wheels 39 and 40, and also like the wheels 26 and 27 of the governor above described, are mounted in movable frames so as to be able to engage with corresponding toothed wheels placed on another shaft in such a manner as to roll, so to speak, on the periphery of these latter wheels. The contact 43, secured to the frame 38, at a certain moment makes contact with the contact 43', Fig. 7. The oscillating bar 13, Figs. 6 and 3, attracted by the electro-magnet 9 9, as will be hereinafter described, immediately causes the ratchet-wheel 36 to advance one tooth by means of a pawl, 44, which is fixed on the said oscillating bar. The frame 38 then falls in so doing, immediately breaking the contact of the parts 43 43'. I would here remark that while the oscillating bar is turning the screw 21 bears on the stop 20 and causes the shaft 11 to turn through a small angle, which I hereinafter designate by $A^{12}$.

From the preceding description it will be seen that the intermittent movement of the wheel 35 transmits a continuous movement to the escape-wheel 42, while giving to the frame 38 an alternating movement. The interval of time between two contacts is constant and easy to regulate by means of a pendulum, 45, Fig. 3. An arrangement for automatically starting the clock-work movement will be hereinafter described.

*Register or counter.*—As will be seen farther on, the total angle through which the shaft 11 turns is composed of two angles, $A^{12}$ and $A^{13}$, which are added to each other, and the sum of which is the measure of the total movement which the shaft makes. The angle $A^{12}$ is a constant angle, while the angle $A^{13}$ is proportional to the power exerted by the electro-dynamometer, and consequently to the product of $E \times 1$. It is therefore only the latter angle, $A^{13}$, which should be registered by the counter N, Fig. 1, at the moment of each measuring operation. The "counter," properly so called, is of any suitable known construction. In the drawings, Fig. 2, I have shown a counter having five numeral-wheels. The shaft 47 is driven by means of brake or clutch mechanism, which is very sensitive and which transmits all the movements with exactitude. On the shaft 47 is fixed a cylinder, 48, (see Figs. 2 and 5,) provided with two grooves, in which are placed triangular pieces of metal wire 49 and 49', each bent at an angle, 50 and 50', the angular parts being rendered flexible by being filed off. The lower end, 51, of the piece 49' is fixed, while the end 52 of the piece 49 enters a small slot, 54, formed in the end of an arm, 53, hinged to the arm 56, fixed on the shaft 11. From this construction it will be seen that any pressure exerted from right to left on the end 52 of the piece 49 tends to close the angle 50, so as to grip the cylinder 48 and cause it to turn, and with it the shaft 47 of the counter, with its numeral-wheels. If, on the contrary, the end 52 is drawn to the right, the angle 50 opens, while the angle 50' closes and grips the cylinder 48, which remains fixed.

Having now described the various parts of my apparatus, I will describe the manner in which it operates.

*Working of the apparatus when electric force is being utilized.*—The principal current from the source of electricity enters the apparatus at M, passes through the coils 1 1′, reaches the terminal P, traverses the lamps L or other apparatus where the power is utilized, and returns by the terminal N⁰ to the source of electricity S, Fig. 1. The wires of the current of derivation necessary for the working of the apparatus are attached to the terminals M and N⁰. They are arranged as shown in Fig. 1. The current of derivation coming from the point M is broken at one side by the contacts 43 and 43′ of the clock-work, and at the other side by the contacts 6 6′ of the electro-dynamometer. The contact-pieces 43 and 6 both communicate with the terminal M. The parts 43′ and 6′ communicate with each other by a wire attached at the points $a$ and $b$. At the point $a$ is also attached one end of the wire of the electro-magnet 9. At the point $b$ is attached one end of the wire of the bobbin 3. The other ends of the said wires of the electro-magnet 9 and of the bobbin 3 are attached at the point $c$, which is connected to the terminal N⁰.

I will describe the action of the apparatus at the moment contact is established at the contacts 43 and 43′ in consequence of the clock-movement being put in operation. The derived current, starting from the terminal M, follows the direction indicated by the arrows ⊙——>, traverses the contacts 43 and 43′, and reaches the point $a$; thence a part passes through the bobbins 9 9 of the electromotor and returns by the point $c$ to the terminal N⁰. Another part passes at $b$ into the bobbin 3, and also leaves at the point N⁰. The electro-magnet at the moment that the bobbins 9 9 are traversed by the current becomes active and produces the following results: The tappet 15 is attracted by the pole-pieces 12′ and closes the contacts 6 6′. The current then traverses the electro-magnet 9 9 and the bobbin 3 through the route indicated by the arrows +——>. The contacts 6 6′ pass from the position 1 to the position Fig. 11ᵃ. The oscillating bar 13 and the armature 10 are both attracted, and together cause the shaft 11 to turn, and with it, by means of the sector 17 and the pinion 18, the spring 7, during a certain movement, the latitude of which is through an angle, $A^{12}$. During this movement the oscillating bar 13 has wound up the clock-work by means of the ratchet 36 and the pawl 44, while lowering the frame 38, as above described, and the contact 43 43′ has been immediately broken. When once the angle $A^{12}$ has been traversed, the oscillating bar 13 remains fixed, supported on the core of the electro-magnet 9, which attracts it and holds it, while the armature 10, continuing its turning movement between the pole-pieces 12 and 12′ continues to progressively distend the spring 7 of the electro-dynamometer by means of the sector 17 and pinion 18. When it has thus traversed in continuation of the angle $A^{12}$, already described, a certain angle, $A^{13}$, the moment arrives when the force of torsion of the spring 7 counterbalances the power exercised by the currents which are acting in the electro-dynamometer A. At this moment the bobbin 3 is drawn along by the spring 7 and the contacts 6 6′ take the position Fig. 11ᵇ, and the contact is thus broken.

It is now easy to ascertain the manner in which the counter registers the angle $A^{13}$ at the moment when the shaft 11 reaches its maximum distance of separation or turning movement. During the first part of this movement corresponding to the angle $A^{12}$, and necessary, as will be hereinafter explained, for the constant winding up of the clock-work, the counter should not register. This is effected by the slot 54, in which slides the end 52 of the piece 49 of the frictional brake or clutch, and owing to this slot the arm 53 will only exert pressure on the piece 49 when the said end 52 comes against the end 55 of the slot. It is thus easy to regulate, by means of a screw, 57, the length of the slot in such a manner that the end 52 meets the end 55 when the shaft 11 has turned through the angle $A^{12}$. The shaft 11 then continuing to turn, the end 52 is pushed forward and the counter is operated by means of the frictional brake or clutch, as above described. The number indicated by the counter multiplied by a constant which it is easy to render equal to 1 or to any value by regulating the length of the spring 7 gives the electrical energy expended in Kilowatt's hours, for example.

I will now return to the "apparatus," properly so called, and to its working, to explain what takes place at the moment of the interruption of the contact 6 6′. On the current being broken it ceases to circulate in the bobbins of the electro-magnet 9 9 and in the bobbin 3. The tappet 15 falls and the contact 6 6′ passes immediately from the position Fig. 11ᵇ to the position Fig. 11ᶜ. The oscillating bar 13 immediately rises, under the action of the spring 23, against its stop 14. The principal shaft 11 turns back, under the action of the spring 19, until the stop 20 again comes into position under the screw 21. The spring 7 is distended and carries back the bobbin 3 to its original position. The contact 6 6′ then retakes the position shown in Fig. 11ᵈ until a fresh contact of the clock-work, when the same cycle of operations will recommence.

*Working of the apparatus when 1 is almost naught.*—However weak may be the intensity of the current, it is necessary that the clock-work be wound up regularly—that is to say, the shaft 11 must describe at least the angle $A^{12}$ under the action of the oscillating bar 13. This result is obtained by giving to the spring 7 on its shaft a retarding angle corresponding to this angle $A^{12}$—that is to say, that even when the intensity is almost naught, and consequently the electro-dynamometer will not exert any electro power, the shaft can be turned through this angle $A^{12}$ without the spring 7 displacing the bobbin 3. As this constant angle does not correspond with any intensity of current, it should not be registered by the counter. For this purpose the play determined by the slot 54 corresponds exactly, as above described, with this angle, so that the apparatus only commences to register on starting from the angle A¹³. (See Fig. 10.)

*Automatic starting of the clock-work.*—It still remains to describe an arrangement for automatically putting in operation the clock-work immediately when the apparatus is put in communication with the source of electricity. The contact 43', Figs. 3 and 7, is fixed to a piece of ebonite, 60, terminating in a steel point, and capable of oscillating slightly on the axis 61. A small spring, 62, keeps it slightly inclined in the position indicated in Fig. 7. The axis 61 is carried by a piece, 63, pivoting at 64, and so counterweighted as to keep the lever 60 in a raised position. A screw, 64', having a hollow point placed on the arm 22 of the oscillating bar 13, is in the plane of oscillation of the piece of ebonite 60.

In ordinary working the contact 43 43' is broken immediately when the screw 64' passes at the side of the steel point and none of the levers moves; but if the circuit is broken in any point the lever 60 is drawn along by the contact 43 under the action of the spring 41 of the clock-work, and the steel point comes into position under the screw 64', when its further movement is arrested by a stop, 69. At the moment when the circuit is re-established the oscillating bar 13 winds up the clock-work in the ordinary way at the same time that the screw 64' lowers the steel point and causes the rod 65 to push the rod 66, having a fork, 67, which raises and puts in an inclined position the suspension-rod 68 of the pendulum 45. At the moment when the contact ceases at 6 6' at the end of the first measuring operation, the screw 64' rises suddenly, releasing the levers, which immediately retake their position. The pendulum thus freed commences to oscillate.

I would here remark that in Fig. 7, in order to render the drawings more clear, I have cut short the suspension-rod 68 of the pendulum. For further clearness, the various toothed wheels, satellites and others, are shown by circles in full lines surrounded by circles in dotted lines indicating the teeth.

*Modified arrangements.*—In order to measure with the counter above described alternating currents, or currents in which the difference of potential varies a great deal, I could employ a source of electricity having a continuous current for working the electromotor. A special circuit can lead this current to a series of counters operated from a central station, for example. The arrangement of the wires in this case is represented by the figure 12, the points $m$ and $n$ being placed in derivation over this special circuit. It results from the working of the apparatus that it is sufficient to establish for a moment the contact 6 6' in order that the apparatus may measure. This contact could be established by the aid of a small electro-magnet actuating the part 6' and traversed by a periodical current of short duration by means of a second special circuit. I can thus have a single clock-work for a series of counters. The arrangement I am about to describe allows by means of a single special circuit ($a$) of employing a special source of electricity to operate the electromotors of a series of counters, and ($b$) of dispensing with the special clock-work for each apparatus. The contact 43 43' is then dispensed with and the arrangement of the contact 6 6' is made as represented in Fig. 13. A spring, 58, acting on the arbor 16, to which is fixed the part 6' of the contact, keeps the circuit of the electromotor closed. The contact 6' is governed on the one hand by the electromotor B itself, which tends to keep it in the closed position, and on the other hand by a weak electro-magnet with wire of great resistance 59 continuously put in derivation on $m$ and $n$, which tends to withdraw it from the contact 6. (See Fig. 13ª, which is a section on the line $p\ p$ of Fig. 13.) Assuming the points $m$ and $n$ are placed in connection with the source of electricity, the current then passes into the electromotor B from one part through the contacts 6 6' and into the electro-magnet 59 from the other, and the contact 6' is kept in place by the action of the electromotor B and of the spring 58. The electromotor works in the ordinary way until contact is broken at 6 6' by the displacement of the bobbin 3 of the electro-dynamometer A. At this moment, the electro-magnet 59 acting only on the contact 6', this latter withdraws itself from the contact 6, and the apparatus returns to its position of rest and remains there during the action of the electro-magnet 59. When the current ceases, the contact-piece 6' falls on the contact 6 under the action of the spring 58.

By these means the apparatus effects a measuring operation at each time that the points $m$ and $n$ are put in connection with the source of electricity. It is thus sufficient for a single clock-work movement, breaking momentarily at regular intervals of time the communication between the points $m$ and $n$ and the source of electricity, to operate a series of counters under the conditions above described.

Having thus described my invention, I claim as new and desire to secure by Letters Patent—

1. A meter or apparatus for measuring the strength of continuous or alternating electric currents, consisting of a torsion electro-dynamometer, an electromotor acting on said dynamometer, a clock-movement operated by the electromotor and controlling the intervals between each measuring operation, a speed regulator or governor for said torsion-dynamometer and electromotor, and a counter operated by the electromotor, substantially as set forth.

2. In a meter or apparatus for measuring the strength of continuous or alternating currents, the combination, with a torsion-dynamometer composed of fixed coils 1 1', the movable bobbin 3 within said coils, the torsion-spring 7, connected with said bobbin, the contact-pieces 6 6', for closing the circuit between the dynamometer and other parts of the apparatus, an electromotor acting on said dynamometer, a clock-movement operated by the electromotor, a speed-regulator for the dynamometer and electromotor, and a counter operated by said electromotor, substantially as set forth.

3. In a meter or apparatus for measuring the strength of continuous or alternating currents, the combination, with a torsion electro-dynamometer, of an electromotor, B, containing the magnets $g\,g$, the pole-pieces 12 12', connected with the magnets 9 9, the oscillating bar 13 at the ends of the magnets, the pawl 44, the shaft 16, the tappet 15 on one end of the same, which tappet is operated by the contact-piece on the dynamometer, which can establish contact with the contact-piece 6', a clock-work driven by the electromotor, a speed-regulator for the dynamometer and electromotor, and a counter operated by the electromotor, substantially as set forth.

4. In a meter or apparatus for measuring the strength of continuous or alternating currents, the combination, with a torsion electro-dynamometer, of an electromotor acting on said electro-dynamometer, a counter operated from the electromotor by a friction-clutch, a clock-movement operated by the motor, and a speed-regulator for the dynamometer and electromotor, substantially as set forth.

5. In a meter or apparatus for measuring the strength of continuous or alternating electric currents, the combination, with a torsion electro-dynamometer, an electromotor, a friction-clutch, a clock-movement containing the wheels 39 and 40, the contacts 43 43', the levers 60 63 65, and the screw 64', of a speed regulator and governor and a counter, substantially as set forth.

6. In a meter or apparatus for measuring the strength of continuous or alternating currents, the combination, with a torsion electro-dynamometer, an electromotor, a frictional brake or clutch, a clock-movement, a speed regulator or governor containing the satellite-wheels 26 and 27, the swinging frame 28, the driving-wheel 25, and the counter, substantially as set forth.

In testimony that I claim the foregoing as my own I have hereunto affixed my signature in presence of two witnesses.

LUCIEN BRILLIÉ.

Witnesses:
CHARLES MATHIEU,
J. L. RATHBONE.